Figure 1:
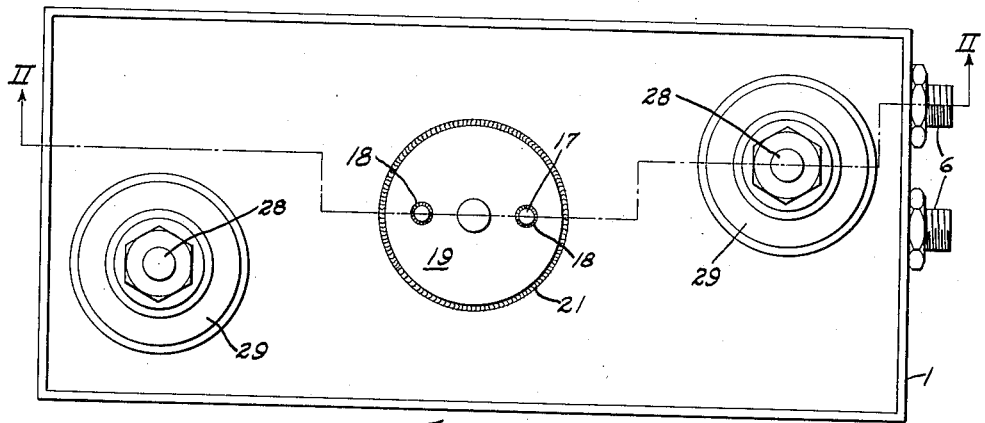

March 28, 1939.  R. E. MARBURY ET AL  2,151,787
ELECTRICAL CAPACITOR
Filed March 5, 1938  2 Sheets—Sheet 1

INVENTORS
Ralph E. Marbury and
Porter H. Brace.
BY
O. B. Buchanan
ATTORNEY

March 28, 1939.  R. E. MARBURY ET AL  2,151,787
ELECTRICAL CAPACITOR
Filed March 5, 1938  2 Sheets-Sheet 2

INVENTORS
Ralph E. Marbury and
Porter H. Brace.
BY
O. B. Buchanan
ATTORNEY

Patented Mar. 28, 1939

2,151,787

UNITED STATES PATENT OFFICE 2,151,787

ELECTRICAL CAPACITOR

Ralph E. Marbury and Porter H. Brace, Wilkinsburg, Pa., assignors to Westinghouse Electric & Manufacturing Company, East Pittsburgh, Pa., a corporation of Pennsylvania Application March 5, 1938, Serial No. 194,156

5 Claims. (Cl. 175—41)

Our invention relates to electrical capacitors and it has particular relation to water-cooled high-frequency capacitors such as are utilized in connection with high-frequency electrical furnaces.

There are two important design-limitations in the design of electrical capacitors. One is the working stress on the dielectric, usually expressed in volts per centimeter; and the other is the maximum temperature of the dielectric, at which point there is an equilibrium between the rate at which heat is generated by reason of the electrical losses in the capacitor and the rate at which heat is dissipated by whatever means is utilized for conducting heat away from the capacitor. In the conventional design of oil-insulated capacitors for power-factor correction at 60 cycles, these two limits, of electrical stress and temperature, are both reached at about the same rating of a capacitor, so that one does not limit the rating materially more than the other does, and no particular heat-exchange medium is required other than the cooling effect of the ambient air upon the capacitor-tank.

When capacitors are designed for operation at high frequencies, such as 1000 cycles or 2000 cycles, if the dielectric is operated at the same stress, in volts per centimeter, as for 60 cycles, the kva. rating of a given size of tank should increase approximately proportionately to the increase in frequency, if there were no other limitation to the design. As the rating is increased, however, the loss is also increased, which means that the capacitor has a strong tendency to run much hotter than before; and when the frequency is increased from 60 cycles to 2000 cycles, it will be obvious that the losses would be increased many times, if the rating were correspondingly increased.

Heretofore, high-frequency capacitor-tanks were simply immersed in cold water, with the result that a rating of about 44½ kva. has been obtained at 1000 cycles, from a capacitor-tank which is of about the same size as a 15-kva. 60-cycle air-cooled tank. According to our present invention, we are able to increase this rating to 230 kva. or more, in a capacitor operating at either 1000 cycles or 2000 cycles.

We have made a careful research into the possibilities of more efficiently cooling the innermost portions of the capacitor-dielectric, by means of cooling water-coils placed inside of the capacitor-tank, and we have made some important discoveries, in connection therewith, which constitute the subject-matter of our present invention.

Capacitors of the type here under consideration are built up of coils consisting of two dielectrics, each consisting of several sheets of paper, or other impregnatable material, and two electrodes, each consisting of one or more sheets of aluminum foil, or equivalent thin conducting sheets, wrapped up on a mandrel which is subsequently removed, the whole being then flattened to form a flat coil of any desired size, usually consisting of a hundred or more turns of the multi-layer paper and foil. At suitable intervals in the winding operation, conducting terminal-strips of thin sheet-metal or foil are generally inserted, some strips making contact with the foil or foils of one polarity, and other strips being in contact with the foil or foils of the opposite polarity, these strips being extended out of the side of the coil and being connected in two groups to constitute the two terminals of the capacitor-coil. A sufficient number of these capacitor-coils are then assembled in a tank, and connected in either series or parallel to obtain the desired rating, and the whole is carefully impregnated in a suitable liquid dielectric, several suitable liquid dielectrics being available for the purpose.

We have found that, if an attempt is made to carry heat away from the capacitor by means of the liquid dielectric, there is necessarily a relatively large temperature-drop between the heat-withdrawing surface and the liquid dielectric, referring either to the tank or to a cooling coil, as the heat-withdrawing surface; there is another very considerable temperature-drop between the liquid dielectric and the exposed surface of the metal part through which heat is conducted away from the central portions of the capacitor coils; and there is a still further temperature-drop in the metal heat-conducting portions themselves, due to the limited cross-section thereof. The temperature-drops in the liquid dielectric are the more serious when an effort is made to hold down the hot-spot temperature by reducing the temperature of the liquid dielectric, because the available liquid dielectrics have a strong tendency to become sticky or gummy when their temperature is greatly reduced, thereby seriously curtailing the convectional transfer of heat through said liquid dielectric, so that most of the heat is conducted by straight heat-conduction through the liquid dielectric, at a very great temperature-drop because of the poor heat-conducting qualities of the dielectric.

It is an important feature of our invention to provide a heat-dissipating system for electrical capacitors of the type utilizing liquid impregnation, in such manner that the liquid dielectric is not utilized to any material extent in the heat-transfer, the heat being carried away from the interior of the individual capacitor-coils by direct metallic conduction to a metallic surface of a heat-transfer medium such as a water-coil.

A more specific object of our invention is to provide foils of adequate cross-section, in a design in which the foils which constitute one terminal of the capacitor are extended out on one side of the capacitor-coil, and are in a good thermal contact, over some considerable area, with a metal surface of a heat-transfer medium such as a water-coil.

A more specific object of our invention is to provide a plurality of special sheet-metal inserts, in contact with the foils of the terminal which is cooled, as just described, said sheet-metal inserts being of a material, such as tinned copper, which is readily susceptible of being soldered or otherwise fused in a molecularly integral metallic connection to the metal surfaces of the heat-transfer medium such as the water coil, the foils themselves being generally of a material, such as aluminum, which is not readily solderable.

A still further object of our invention is to provide a novel twisted-coil construction of the water-coils, leaving unobstructed spaces for the high-potential terminals.

Figure 2:
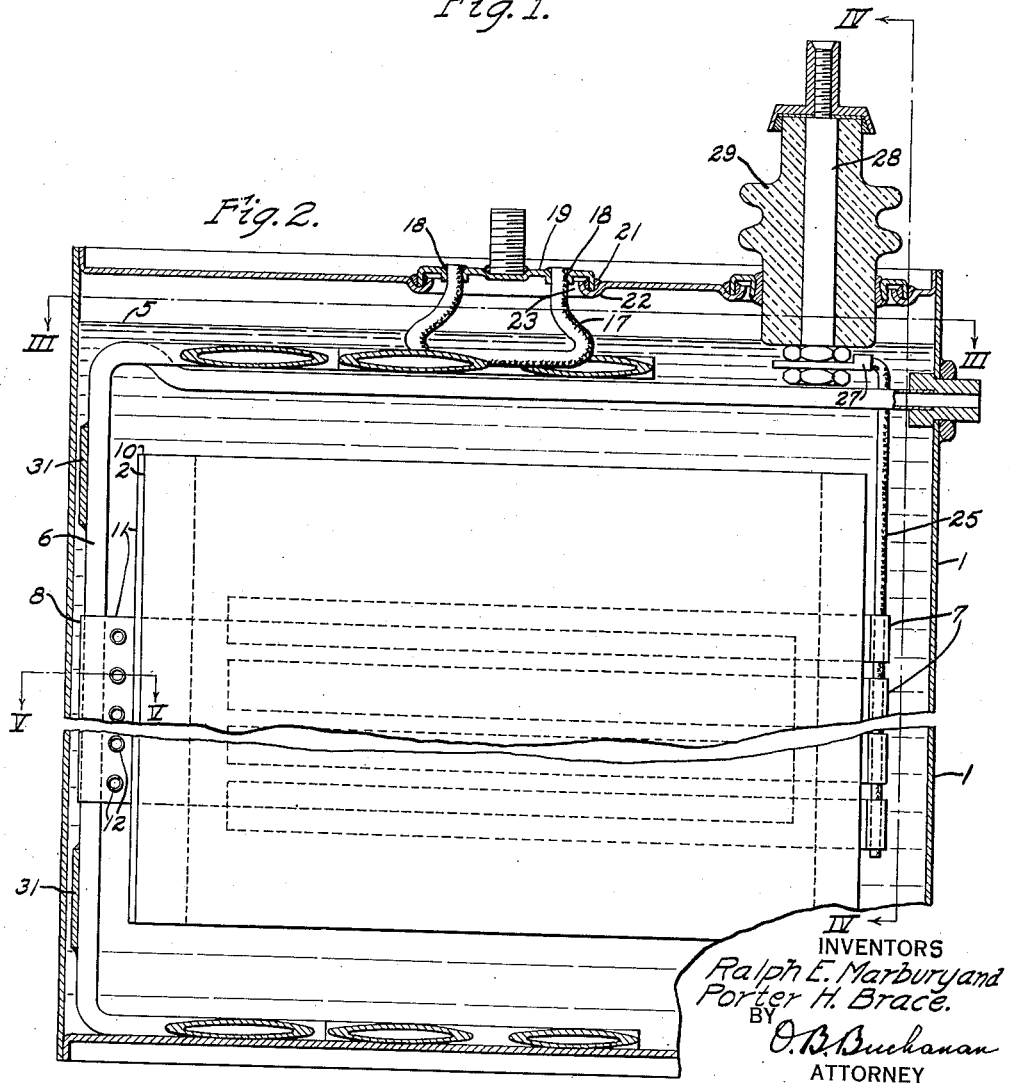
Figure 3:
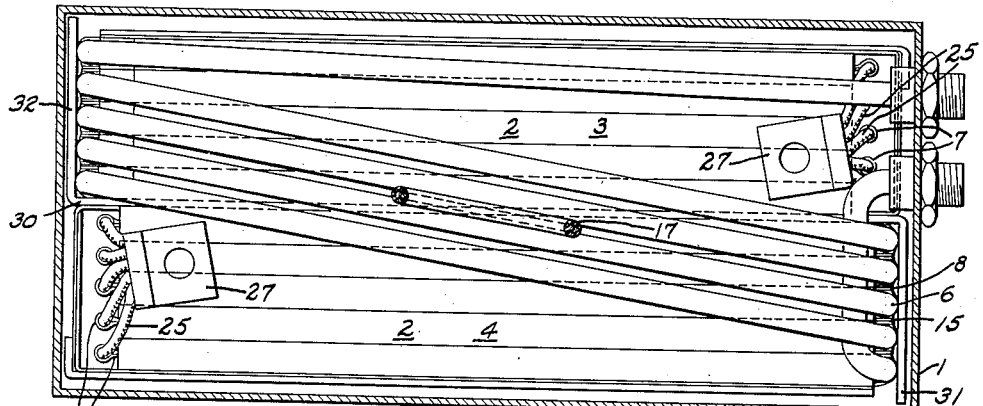
Figure 4:
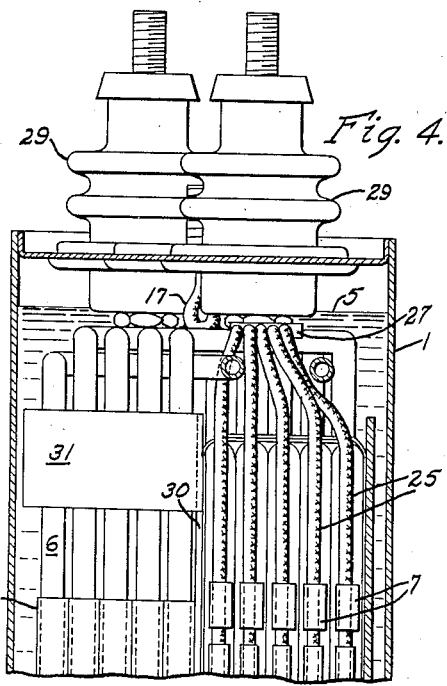
Figure 5:
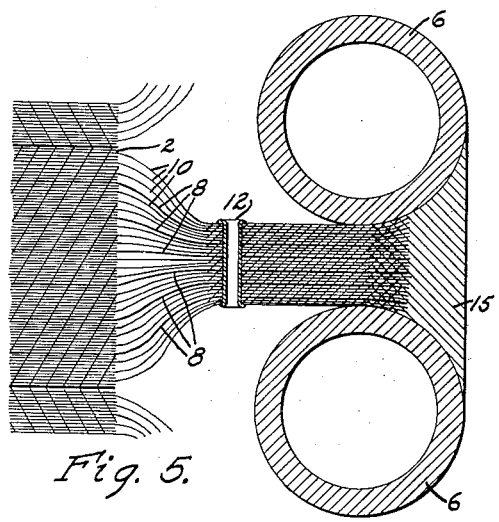
Figure 6:
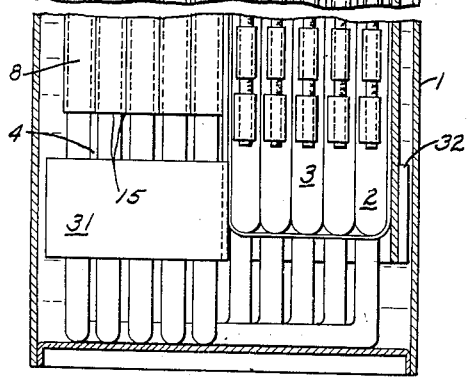
Figure 6:
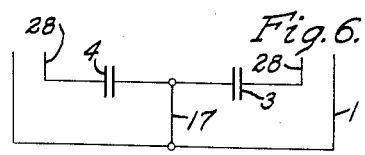

With the foregoing and other objects in view, our invention consists in the structure, combinations and methods hereinafter described and claimed and illustrated in the accompanying drawings, wherein Figure 1 is a plan view of a capacitor-tank embodying our invention, Fig. 2 is a sectional view taken on the line II—II of Fig. 1, Fig. 3 is a sectional view on the line III—III of Fig. 2, Fig. 4 is a sectional view on the line IV—IV of Fig. 2, Fig. 5 is a detailed enlarged sectional view on the line V—V of Fig. 2; and Fig. 6 is a diagrammatic view illustrative of the electrical connections.

In the particular embodiment of our invention shown in the drawings, our capacitor is enclosed in a tank 1 which contains a plurality of individual capacitor-coils 2. In this case, there are ten coils 2, arranged in two groups 3 and 4, of five coils each, and five coils being respectively connected together in parallel with each other, and the two parallel groups being connected in series, as will be subsequently explained. As is usual, in the type of capacitor to which our invention more particularly relates, the capacitor coils 2 are wound from paper and foil in a manner somewhat similar to that previously described, and are impregnated in a liquid insulating dielectric medium 5.

As a feature of our invention, heat-exchange surfaces are introduced in the interior of the tank 1, these surfaces, in the illustrated assembly, taking the form of copper coils 6 through which water or other heat-exchanging fluid is circulated. The preferred arrangement of the water-coils 6 is somewhat peculiar, and can best be described with reference to the disposition of the capacitor coils 2. These capacitor coils are stacked flatwise in two stacks. In each stack, the terminal-tabs 7 of one terminal project all from the same side of the stack, while the terminal-tabs 8 of the other electrode extend from the opposite side of the stack, as illustrated in Fig. 2. The two stacks are reversed with respect to each other and are both stood on edge, so that, when viewed from either the side or the top, as in Figs. 2 and 3, for example, the terminal-tabs 7 of the group 3 and the terminal-tabs 8 of the group 4 extend to the right while the terminal-tabs 8 of the group 3 and the terminal-tabs 7 of the group 4 extend to the left.

In accordance with our invention, the water-coils 6 are utilized for cooling the terminal-tabs 8, and the sides of the water-coils are so arranged that they are disposed adjacent to the two groups of terminal-tabs 8, and in parallel relation thereto. Since one group of these tabs is toward the front, at the right-hand end of the tank, and the other group is toward the rear at the left-hand end of the tank, the top and bottom sides of the water-coils extend diagonally across the top and bottom sides of the tank, as shown in Fig. 3.

It is an important feature of our invention that provision should be made for a very efficient conduction of heat directly from the vertical sides of the cooling-coils 6 of the terminal-tabs 8 and to the foil or foils with which they are in electrical and mechanical contact. Heretofore, the terminal-tabs of electric capacitors have been made in the form of narrow strips, such as the tabs 7, the width of the strip being determined solely by the necessary current-carrying capacity. The aggregate cross-section of such tabs has been inadequate for the easy flow of heat longitudinally along the tabs, that is, from the innermost portions of the coil out to the outer end of each tab. This construction of narrow terminal tabs 7 is still utilized by us, for the terminals 7 in the particular embodiment illustrated in the drawings, because we do not provide for any particular heat-flow through these tabs.

In accordance with our invention, however, the other terminal tabs 8 are designed to be in intimate heat-conducting relation to the water-coils 6, and the interior heat is withdrawn from the coils 2 through these tabs and through the foils with which said tabs 8 are in contact. In order to facilitate this heat-flow, the foil with which the terminal-tab 8 is associated is preferably made double in thickness, or two layers of foil wound in contact with each other, and these foils are brought out all the way and beyond the end of the coil, so that they stick out beyond the paper of the coil, as indicated at 10 in Fig. 2. Heretofore, when the only function of the terminal-tabs was to conduct current, the foils have terminated within the confines of the paper in the coil, with only the terminal tabs, such as 7, extending out beyond the side of the coil, but, in our capacitor, it is essential to convey as much heat away from the center of the coil with as little temperature-drop as is conveniently attainable, and so we cause the whole foil, of the polarity associated with the terminal-tabs 8, to be extended beyond the side-edge of the coil, that is, beyond the paper.

In addition to the foregoing, in accordance with our invention, we make the terminal-tabs 8 as wide as is conveniently practicable, and of a somewhat larger sheet-thickness than would be dictated by considerations of mere current-carrying capacity, so as to facilitate the heat-transfer from the center of the coil. In the particular embodiment of the invention shown in the drawings, the terminal-tabs 8 are not quite as wide as the flattened-out coil 2, because of the presence of other structural features (subsequently described), and the protruding ends of the foil 10 are notched or cut away, as indicated at 11, to reduce these layers of foil (sometimes referred to as foils or conducting sheets) to the same width as the terminal-tabs 8. I prefer to use a plurality of these terminal-tabs 8 distributed at a number of points throughout the layers of the coil 2. The bundle of foils 10 and tabs 8, thus produced, are preferably then mechanically fastened together, as by means of eyelets 12, providing a fairly stiff bundle of foils and tabs projecting out from the side of each of the coils 2.

Preferably, the number of coils in the water-coil 6 is so chosen that the spaces between the vertical coil-sides, which are parallel with respect to the eyeleted bundles of foils 10 and tabs 8, correspond in position with these bundles of tabs and foils, so that said bundles will fit snugly in said spaces where they may be secured in adequate heat-transferring relation, as will now be described.

In considering the problem of making a good thermal connection between the bundle of foils 10 and terminal-tabs 8 to the copper water-pipes 6, it should be noted that the foil 10 is, in general, made of aluminum, which cannot be readily soldered, and which also has the characteristic of entrapping dead-air films or pockets, between the layers, unless special precautions are utilized, such as the utilization of a cementing substance of fairly good heat-conducting properties. Aluminum is chosen, for the foil, rather than one of the more readily solderable metals, because the latter, in general, are more expensive, if obtainable at all in foils of sufficient thickness to be readily wound up into a coil with the paper. The terminal-tabs 8 are of copper, and in order to be readily solderable, they should be tinned. They should also be of sufficient cross-section to carry the heat from the innermost recesses of the coil 2 to the copper water-pipe 6.

According to the preferred form of our invention, this bundle of aluminum foil 10 and tinned-copper terminal-tabs 8 is soldered or otherwise fused in a molecularly integral metallic connection to the water-pipe 6, as indicated at 15 in Figs. 4 and 5, care being taken to provide a sufficient thickness of solder 15, for effective heat-conduction, and to provide a sufficiently large heat-conducting area of contact, both between the water-coils 6 and the solder 15, and between the solder 15 and the copper terminal-tabs 8. It will thus be observed that we have provided a good direct thermal connection between the bundle of foil 10 and tabs 8 and the water-pipe 6, and particularly between the readily solderable tinned-copper tabs 8 and the pipes 6. It will be further observed that this connection is a permanent one, not depending upon a mere causal contact, at a few points, between the tabs and the pipe, which is subject to dislodgement due to jarring in the shipment of the apparatus from the manufacturer to the user, or subject to dislodgement due to rust-films, or the like, which might interpose a heat-insulating layer between the surfaces across which the heat should flow in getting from the interiors of the capacitor-coils 2 to the water-pipe 6.

Our above-described connection between the bundles of foil 10 and tabs 8 and the water-pipe 6 is preferably one which utilizes some sort of adhering or cementing connection, as distinguished from one which depends solely upon a contact-pressure which is applied to the respective surfaces, to hold them together, and this adhering or cementing connection may be any connection of this sort, preferably utilizing a joining material, precluding dead air-pockets, which, either by reason of its application as a thin film, coupled by a moderately poor heat-conductivity, as in the case of certain cements, or by reason of its very excellent heat-conducting properties, as in the case of metallic solder, provides a reasonably good, continuous heat-conducting path between each bundle of foil 10 and tabs 8 and the water-pipe 6.

It will be observed that the terminal-tabs 8 of each of the two capacitor-groups 3 and 4 are grounded on the water-pipe 6, which, in the preferred form of my invention, is also grounded upon the frame 1. This so-called grounded point may be utilized either as one of the terminals of the capacitor, in which case the other two terminals would also be connected together, so that the two capacitor-groups are connected in parallel, or the capacitor may be utilized with the two capacitor groups 3 and 4 in series, in which case no current would be withdrawn from the intermediate or grounded point or tank, which, for convenience in speaking, is referred to as the low-potential terminal.

Inasmuch as the current carried by the capacitor will be of considerable magnitude, it is necessary to provide a very good electrically continuous conducting-path for the grounded tap, not dependent on the casual contacts between the water-coil and tank, and to this end we provide, at the top of the water-coil 6, a soldered flexible grounding-cable 17, which is soldered by means of hard solder 18 to a grounded-terminal plate 19 which, after the capacitor has been assembled, is soldered with soft solder 21 in a depression 22 around a central opening 23 in the top of the tank 1, the difference in melting point between the hard and soft solders 18 and 21 being sufficient to permit this sequence of operations without having the second soldering operation disturb the soundness of the first.

The terminal leads to the so-called high-voltage tabs 7 of the respective capacitor-groups 3 and 4 are made in a conventional fashion, utilizing cable-conductors 25 around which the tabs 7 are wound and soldered, said cable-conductors 25 being united, at the top, in a terminal connection 27 which is bolted to a terminal conductor 28 which extends out of the tank through a suitable insulating bushing 29. It will be understood that two of these high-voltage terminal connections are provided, one for each of the coil-groups 3 and 4, as shown.

From the foregoing description, it will be observed that we withdraw the heat exclusively from one end of each of the capacitor-groups 3 and 4, from the right-hand end of one, and from the left-hand end of the other, and that the sides of our water-pipe, which is coiled around the capacitor-groups, are disposed at these ends of the respective capacitor-groups, the top and bottom sides of the water coils being disposed diagonally. From a top view of the water-pipe assembly, with the two capacitor-groups which it encompasses, it will be seen that the high-voltage terminal-cables 25 of these two coil-groups 3 and 4 are not encumbered by water pipes, so that ample clearance is provided for these high-voltage connections.

As a practical detail of our invention, which we prefer to utilize, but which perhaps is not at all necessary, we provide a central dividing and stiffening plate 30, which is provided between the two capacitor groups 3 and 4, and which is provided with oppositely bent end-flanges 31 and 32, which are soldered to the water pipes 6, as shown in Fig. 2, and which serve to brace the water-pipe coil-structure and to facilitate the assembly of the two groups of capacitor-coils therein.

An advantage of the conduction of heat from only the grounded or so-called low-potential terminal of each of the capacitor-groups is that the water-pipes 6 do not need to be insulated from the tank 1, and the external water connections (not shown) for conducting water to and from the cooling coil, do not need to be insulated from the tank-potential or ground. While this is our preferred construction, it will readily be understood that similar (but insulated) cooling means may be also applied to the high-voltage terminal-connections.

While we have illustrated our invention in a form of embodiment which is at present preferred by us, we desire it to be understood that such illustration is to be taken only by way of suggestion, and not by way of limitation of our invention, as various changes in specific structural details may be adopted without departing from the essential spirit and scope of our invention, particularly in its broader aspects. We desire, therefore, that the appended claims shall be accorded the broadest interpretation consistent with their language and the prior art.

We claim as our invention:

1. An electrical capacitor comprising, in effect, a large number of layers of thin electrically conducting sheets separated by sheet-like dielectric, terminal-means associated with some of said conducting sheets for providing an electrode-terminal of one polarity, terminal-means associated with others of said conducting sheets for providing an electrode-terminal of the opposite polarity, at least one of said terminal-means comprising laterally extending portions of some of said conducting sheets extending out of the side of the capacitor at one place, said laterally extended conducting sheets being of fairly good thermal conductivity, said terminal means further comprising a group of good electrically and thermally conducting tabs interspersed throughout the capacitor in contact with some of said extended conducting sheets, said tabs extending out of the side of said capacitor at said place, one or more cooled heat-withdrawing surfaces of good heat-conducting material disposed in juxtaposition to the extending portions of said conducting sheets and the extending ends of the interspersed terminal tabs, and means for providing a direct broad-surface heat-conducting connection between said heat-withdrawing surface or surfaces and said extending portions and tabs.

2. An electrical capacitor comprising, in effect, a large number of layers of thin electrically conducting sheets separated by sheet-like impregnatable dielectric material, an enclosing tank surrounding said capacitor, an impregnating liquid dielectric in said tank, terminal-means associated with some of said conducting sheets for providing an electrode-terminal of one polarity, terminal-means associated with others of said conducting sheets for providing an electrode-terminal of the opposite polarity, at least one of said terminal-means comprising laterally extending portions of some of said conducting sheets extending out of the side of the capacitor at one place, said laterally extended conducting sheets being of fairly good thermal conductivity, said terminal means further comprising a group of metal tabs interspersed throughout the capacitor in contact with some of said extended conducting sheets, said tabs extending out of the side of said capacitor at said place, one or more cooled heat-withdrawing metal surfaces disposed in juxtaposition to the extending portions of said conducting sheets and the extending ends of the interspersed terminal tabs, and means for providing a direct heat-conducting connection between said heat-withdrawing surface or surfaces and said extending portions of said conducting sheets and extending ends of said tabs, said heat-conducting connection including a fused molecularly integral metallic connection between two or more metal parts.

3. An electrical capacitor comprising two serially connected groups of parallel-connected capacitor-coils, each coil having two terminals of opposite potentials extending out from opposite sides of the coil, the two groups being so stacked that the high-potential terminal of one group and the low-potential terminal of the other group are at one side of the capacitor, and so that the other two terminals are at the other side of the capacitor, a plurality of cooling coils for a cooling fluid disposed around the capacitor-groups in such manner that spaced cooling-coil sides extend alongside of each of the low-potential terminals, with at least some of said low-potential terminals extending between said cooling-coil sides, and with all of said low-potential terminals firmly united to said cooling coils with a broad-surface adhering connection of good heat-conductivity, the other cooling-coil sides extending diagonally across said groups of capacitor-coils, leaving free spaces for said high-potential terminals, said low-potential terminals being of adequate cross-section to provide a heat-conducting path of good conductivity from the innermost recesses of the capacitor-coils to the cooling coils, a tank enclosing said capacitor-coils and cooling coils, and a filling of liquid dielectric in said tank.

4. The invention as defined in claim 3, characterized by said heat-conducting connection comprised a fused molecularly integral metallic connection between said low-potential terminals and said cooling coils.

5. The invention as defined in claim 3, characterized by said heat-conducting connection comprised a fused molecularly integral metallic connection between said low-potential terminals and said cooling coils, and a central metal dividing-plate disposed between the two groups of capacitor-coils, said central dividing-plate being provided with end-tabs at right angles to the plate, said end-tabs being connected with a fused molecularly integral metallic connection to said cooling coils.

RALPH E. MARBURY.
PORTER H. BRACE.